(12) United States Patent
Mizusawa et al.

(10) Patent No.: US 7,887,606 B2
(45) Date of Patent: Feb. 15, 2011

(54) FUEL REFORMING APPARATUS AND METHOD FOR STARTING SAID FUEL REFORMING APPARATUS

(75) Inventors: Minoru Mizusawa, Tokyo (JP); Sakae Chijiiwa, Tokyo (JP)

(73) Assignee: Ishikawajima-Harima Heavy Industries Co., Ltd., Tokyo (JP)

( * ) Notice: Subject to any disclaimer, the term of this patent is extended or adjusted under 35 U.S.C. 154(b) by 1137 days.

(21) Appl. No.: 10/553,036

(22) PCT Filed: Feb. 12, 2004

(86) PCT No.: PCT/JP2004/001455

§ 371 (c)(1),
(2), (4) Date: Oct. 11, 2005

(87) PCT Pub. No.: WO2005/077822

PCT Pub. Date: Aug. 25, 2005

(65) Prior Publication Data

US 2006/0207179 A1    Sep. 21, 2006

(51) Int. Cl.
| | |
|---|---|
| C01B 3/36 | (2006.01) |
| C01B 3/02 | (2006.01) |
| C01B 3/24 | (2006.01) |
| C01B 3/26 | (2006.01) |
| C01B 3/12 | (2006.01) |
| C10J 3/46 | (2006.01) |
| C10J 3/54 | (2006.01) |
| B01J 7/00 | (2006.01) |
| H01M 8/06 | (2006.01) |

(52) U.S. Cl. ............... 48/197 R; 48/61; 423/648.1; 423/650; 423/651; 423/655

(58) Field of Classification Search ............... 48/61, 48/197 R
See application file for complete search history.

(56) References Cited

U.S. PATENT DOCUMENTS

| 6,413,479 B1 * | 7/2002 | Kudo et al. ............... 422/198 |
| 7,297,169 B2 * | 11/2007 | Pham et al. ............... 48/198.7 |
| 2004/0144029 A1 * | 7/2004 | Miura et al. ............... 48/127.9 |

FOREIGN PATENT DOCUMENTS

| JP | 11-255501 | 9/1999 |
| JP | 2003-089504 | 3/2003 |
| JP | 2003-238109 | 8/2003 |
| JP | 2003-300703 | 10/2003 |
| JP | 2003-327405 | 11/2003 |
| WO | WO 02098790 A1 * | 12/2002 |

* cited by examiner

Primary Examiner—Alexa D Neckel
Assistant Examiner—Matthew J Merkling
(74) Attorney, Agent, or Firm—Oblon, Spivak, McClelland, Maier & Neustadt, L.L.P.

(57) ABSTRACT

A fuel reforming apparatus is provided such that an assembled unit of a reformer 1 with its associated instruments (a water vaporizer 2, primary fuel gasifier 3, desulfurizer 4, low-temperature shift converter 5 and selective oxidation CO remover 6) is covered with and enclosed by a vacuum heat insulating vessel 15 with inner and outer cylinders 15a and 15b and a vacuum heat insulating layer 15c between them. No heat insulating material such as ceramic fiber is required to be charged between the instruments and thus the heat insulating layer may be reduced in volume.

8 Claims, 4 Drawing Sheets

FUEL REFORMING APPARATUS AND METHOD FOR STARTING SAID FUEL REFORMING APPARATUS

TECHNICAL FIELD

The present invention relates to a fuel reforming apparatus and a method for starting said fuel reforming apparatus.

BACKGROUND ART

In general, a fuel cell is such that, inversely to electrolysis of water, hydrogen is coupled with oxygen and electricity and heat generated thereupon are taken out. Because of their higher electricity generation efficiency and adaptability to environment, fuel cells have been actively developed for household-fuel-cell cogeneration systems and fuel-cell-powered automobiles. Hydrogen as fuel for such fuel cells is produced by reforming, for example, petroleum fuel such as naphtha or kerosene or city gas through a reformer.

FIG. 1 shows a whole system for a residential type polymer electrolyte fuel cell (PEFC) as an example of an installation with a reformer in which reference numeral 1 denotes a reformer; 2, a water vaporizer to vaporize water into water vapor through heat of exhaust gas from the reformer 1; 3, a primary fuel gasifier to gasify primary fuel such as naphtha through heat of the exhaust gas; 4, a desulfurizer to desulfurize source gas to be fed to the reformer 1; 5, a low-temperature shift converter to lower the reformed gas from the reformer 1 to a required temperature (about 200-250° C. or so) through cooling water so as to change CO and $H_2O$ into $CO_2$ and $H_2$; 6, a selective oxidation CO remover which removes CO by an oxidation reaction from reformed gas passed through the shift converter 5 controlled by cooling water; 7, a humidifier to humidify the reformed gas having passed through the CO remover 6; and 8, a PEFC with a cathode 8a and an anode 8b.

In the installation shown in FIG. 1, water is vaporized by the vaporizer 2 into water vapor while the fuel such as naphtha is gasified by the gasifier 3 into source gas. The source gas mixed with the water vapor is guided to the desulfurizer 4 and the source gas desulfurized in the desulfurizer 4 is guided to the reformer 1. The gas reformed by the reformer 1 is guided via the shift converter 5, CO remover 6 and humidifier 7 to the anode 8b of the PEFC 8 while the air is guided through the humidifier 7 to the cathode 8a of the PEFC 8, thereby generating electric power. Anode off-gas from the anode 8b is re-utilized as fuel gas in the reformer 1 while the water from the cathode 8a is utilized as cooling water for the PEFC 8, CO remover 6 and shift converter 5 and as part of the water vapor to be mixed with the source gas.

Conventionally, the reformer 1 and its associated instruments or the vaporizer 2, gasifier 3, desulfurizer 4, shift converter 5 and CO remover 6 are assembled as an unit into a fuel reforming apparatus as shown in FIG. 2. The reformer 1 in the fuel reforming apparatus comprises a reforming vessel body 9 to which the anode off-gas is fed as fuel gas and to which the air is introduced. In the vessel body 9, a first catalytic combustor 10 is arranged to burn the fuel gas to attain rise in temperature. In the vessel body 9 and downstream of the combustor 10, a reforming cylinder 12 is arranged coaxially of the vessel body 9, the cylinder 12 being charged with reforming catalysts (not shown) and having the source gas passed therethrough for reforming of the gas. In the vessel body 9 and peripherally on the cylinder 12, a second catalytic combustor 11 is arranged to burn again the combustion exhaust gas, which has been lowered in temperature due to heat exchange with the source gas flowing through the cylinder 12, so as to attain rise in temperature.

The anode off-gas fed as fuel gas to the reformer 1 is low in calorie and is hard to ignite. However, in the reformer 1 of the fuel reforming apparatus as shown in FIG. 2, exothermic heat is generated through an oxidation reaction forcibly conducted in the combustor 10 as the fuel gas and air are fed to the vessel body 9. Using this as heat source, reforming is conducted as the source gas passes through the reforming catalysts (not shown) in the cylinder 12, thereby generating reformed gas which passes through the shift converter 5 and CO remover 6 to be discharged as CO-free reformed gas. The combustion exhaust gas lowered in temperature by removal of heat due to the reforming reaction of the source gas is burnt again for temperature rising in the combustor 11, is heat-exchanged with the water for reformation in the vaporizer 2 and with the primary fuel such as naphtha in the gasifier 3 and then is discharged.

With the reformer 1 in the fuel reforming apparatus as shown in FIG. 2, however, the combustion temperature cannot be made higher than a tolerable temperature of the catalysts in the combustor 10, so that air must be oversupplied for dilution, resulting in increased air/fuel ratio. As a result, heat transfer area must be increased, leading to increase in length of the reformer 1.

Since the fuel reforming apparatus itself is desired not to have substantial height, the CO remover 6, desulfurizer 4, shift converter 5 and the like are arranged around the reformer 1 as shown in FIG. 2. The reformer 1 is a device to conduct heat exchange at very high temperature (about 750° C. or so) and reaction temperature level therein is different from that in the shift converter 5 or in the CO remover 6, so that heat insulating material 13 such as ceramic fiber is charged between the respective instruments and the whole is covered with and enclosed by heat insulating material 13 to provide a heat insulating layer 14.

However, charging the heat insulating material 13 such as ceramic fiber between the respective instruments and enclosing the whole by the material 13 to provide the heat insulating layer 14, as mentioned above, will increase in volume the layer 14 over the fuel reforming apparatus and construction work for them will be laborious and time-consuming. Moreover, whenever the catalysts in the reformer 1 are to be exchanged and/or maintenance such as inspection is to be conducted, the heat insulating material 13 must be removed and the reforming vessel body 9 must be cut, which will be disadvantageously much laborious and time-consuming.

When the conventional fuel reforming apparatus as shown in FIG. 2 having been lowered in temperature to a room temperature is to be started, startup fuel is burnt in the catalytic combustors 10 and 11 as heat source, which may heat the cylinder 12, vaporizer 2 and gasifier 3 through heat exchange with the combustion gas generated, but does not heat the shift converter 5 and CO remover 6 which are kept warm through heat insulation to outside and cannot be heated from outside. They may be raised in temperature only by flowing of nitrogen and/or steam therethrough; however, nitrogen and steam are generally of not so high temperature. Therefore, it takes much time to heat the reactors such as the shift converter 5 and CO remover 6 to required temperatures.

The invention was made in view of the above and has its object to provide a fuel reforming apparatus which can make its unnecessary to charge heat insulating material such as ceramic fiber between instruments, which enables decrease in volume of the heat insulating layer, which can bring about compactness in size of the apparatus and increased thermal efficiency, which can drastically relieve time and labor for construction work of the heat insulating layer and which can facilitate maintenance. The invention also provides a method for starting a fuel reforming apparatus which can shorten startup time.

SUMMARY OF THE INVENTION

The invention is directed to a fuel reforming apparatus comprising an assembled unit of a reformer with its associated instruments and characterized in that the assembled unit of the reformer with its associated instruments is covered with and enveloped by a vessel to provide a heat insulating layer around the unit.

According to the above measures, the following effects and advantages can be obtained.

The construction work of the heat insulating layer is completed merely by enclosing the unit with the vessel. As a result, unlike the conventional apparatuses, there is no need of charging heat insulating material such as ceramic fiber between the reformer and its associated instruments, which fact drastically relieves construction work for the heat insulating layer. Moreover, whenever the catalysts in the reformer are to be replaced or whenever maintenance such as inspection is to be conducted, merely opening the vessel will suffice and there is no need of removing the heat insulating material and/or cutting the reformer.

In the above-mentioned fuel reforming apparatus, the vessel may be a vacuum heat insulating vessel with inner and outer cylinders and a vacuum heat insulating layer therebetween, leading to extremely enhanced heat insulating performance, decrease in volume of the heat insulating layer, potentiality of the apparatus being made compact in size, suppressed heat dissipation and improvement in thermal efficiency.

In the above-mentioned fuel reforming apparatus, an interior of the vessel may be utilized as a flow path of the combustion gas for the reformer, which brings about simplification in structure of the whole apparatus and thus reduction in cost. In this connection, the reformer may comprise a furnace flue having the combustion gas from the combustor flowing therethrough and a plurality of reforming tubes arranged side by side in the flow path of the combustion gas between the furnace flue and the vessel and having reforming catalysts charged therein for flowing of the source gas therethrough for reforming of the gas, which makes it possible to shorten in length the reformer through utilization of the multiple reforming tubes and utilization of radiant heat transfer due to high-temperature combustion in the combustor, with an advantageous result that the associated instruments may be arranged beneath the reformer with no fear of the fuel reforming apparatus being increased in height.

In the above-mentioned fuel reforming apparatus, the associated instruments of the reformer may include a water vaporizer to vaporize water into water vapor through heat of exhaust gas from the reformer, a low-temperature shift converter to lower the gas modified in the reformer to a required temperature so as to change CO and $H_2O$ into $CO_2$ and $H_2$ and a CO remover to cool the reformed gas having passed through the shift converter so as to remove CO.

The associated instruments of the reformer may further include a primary fuel gasifier to gasify primary fuel through heat of the exhaust gas and a desulfurizer to desulfurize source gas to be fed to the reformer.

The CO remover may be a selective oxidation CO remover or a methanator.

The invention further provides a method for starting a fuel reforming apparatus wherein an assembled unit of a reformer with its associated instruments is covered with and enclosed by a vessel to form a heat insulating layer therearound, an interior of said vessel being utilized as a flow path of combustion gas for the reformer, a water vaporizer, a low-temperature shift converter and a CO remover being arranged as associated instruments of said reformer in said flow path, characterized by burning startup fuel without supply of primary fuel to the reformer so that resultant combustion gas from said burnt startup fuel is not heat exchanged with the primary fuel in the reformer and is guided to said flow path while being still hot, whereby the combustion gas flows around and heats the shift converter and the CO remover.

As mentioned above, upon starting of the fuel reforming apparatus, the startup fuel is burnt with no supply of primary fuel to the reformer; the resultant combustion gas from the burnt startup fuel is heat exchanged with no primary fuel in the reformer and is guided to said flow path while it is still hot, with the result that the combustion gas flows around and heats the shift converter and CO remover. As a result, it does not require a long time to elevate these reactors to required temperatures and thus the startup time is drastically shortened.

BEST MODE FOR CARRYING OUT THE INVENTION

An embodiment of the invention will be described in conjunction with the drawings.

Figure 1:
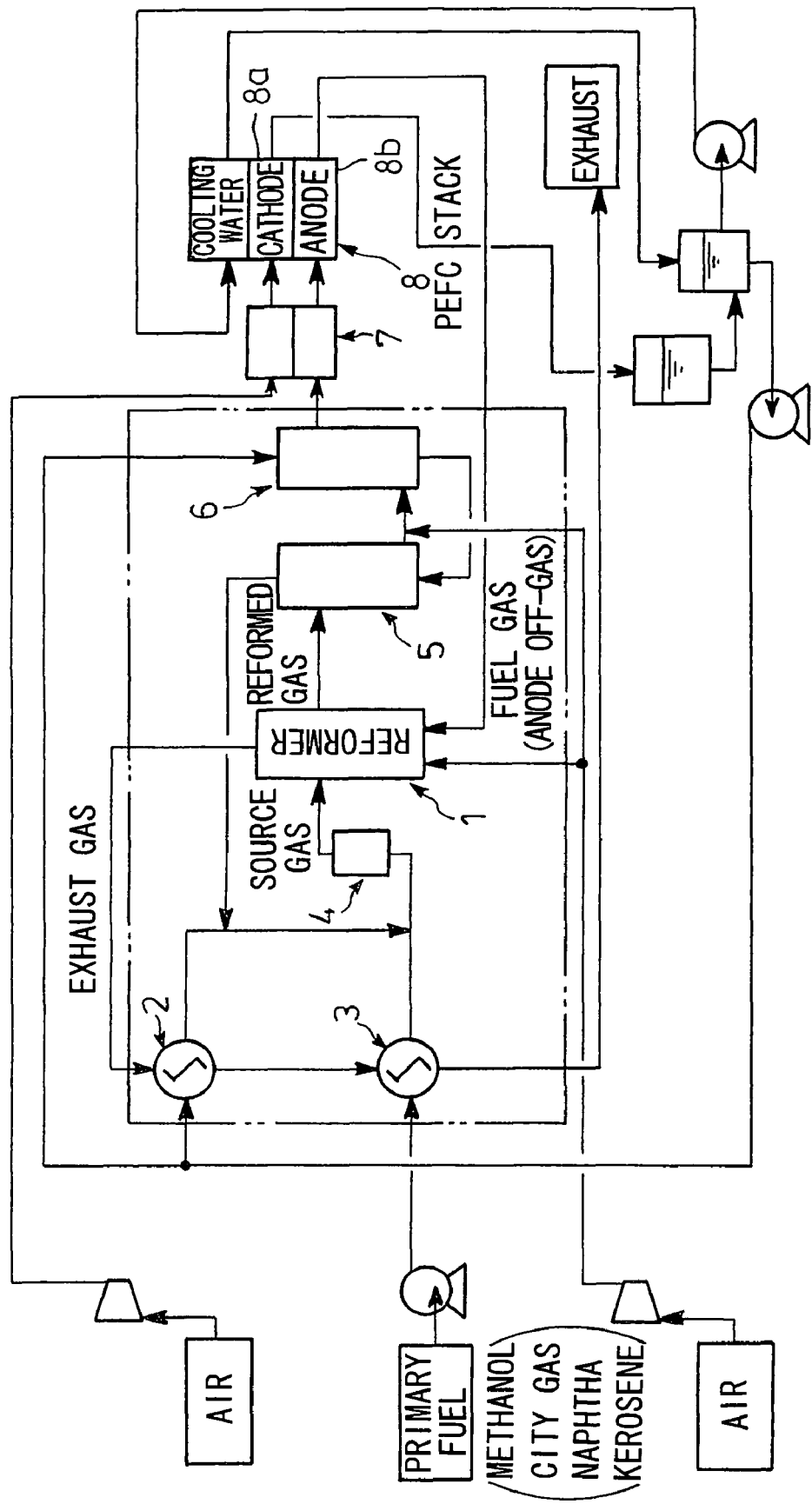
FIG. 1 is a view showing a whole system of an example of an installation with a reformer.
Figure 2:
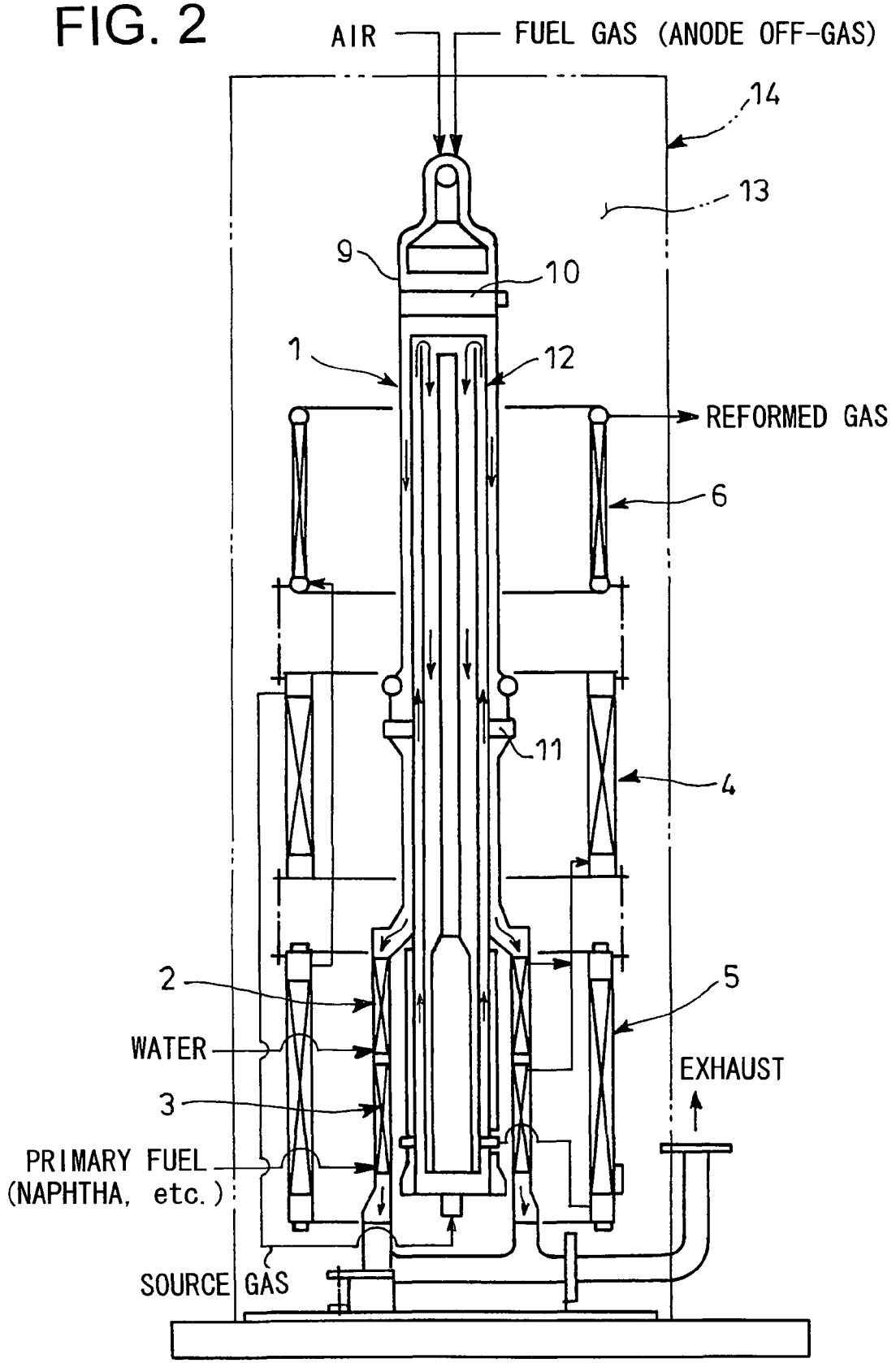
FIG. 2 is a sectional side elevation showing a conventional fuel reforming apparatus.
Figure 3:
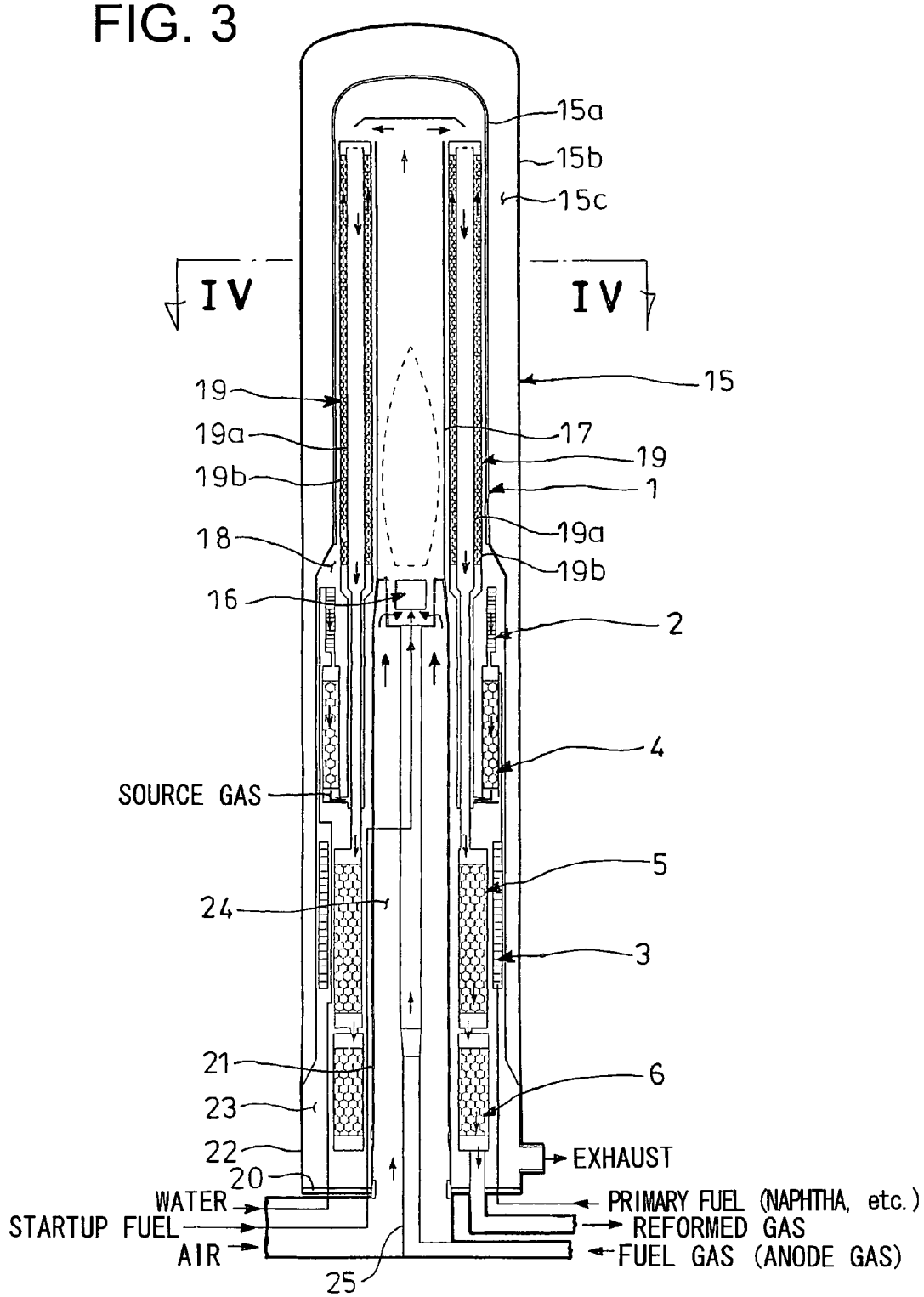
FIG. 3 is a sectional side elevation of an embodiment according to the invention.
Figure 4:
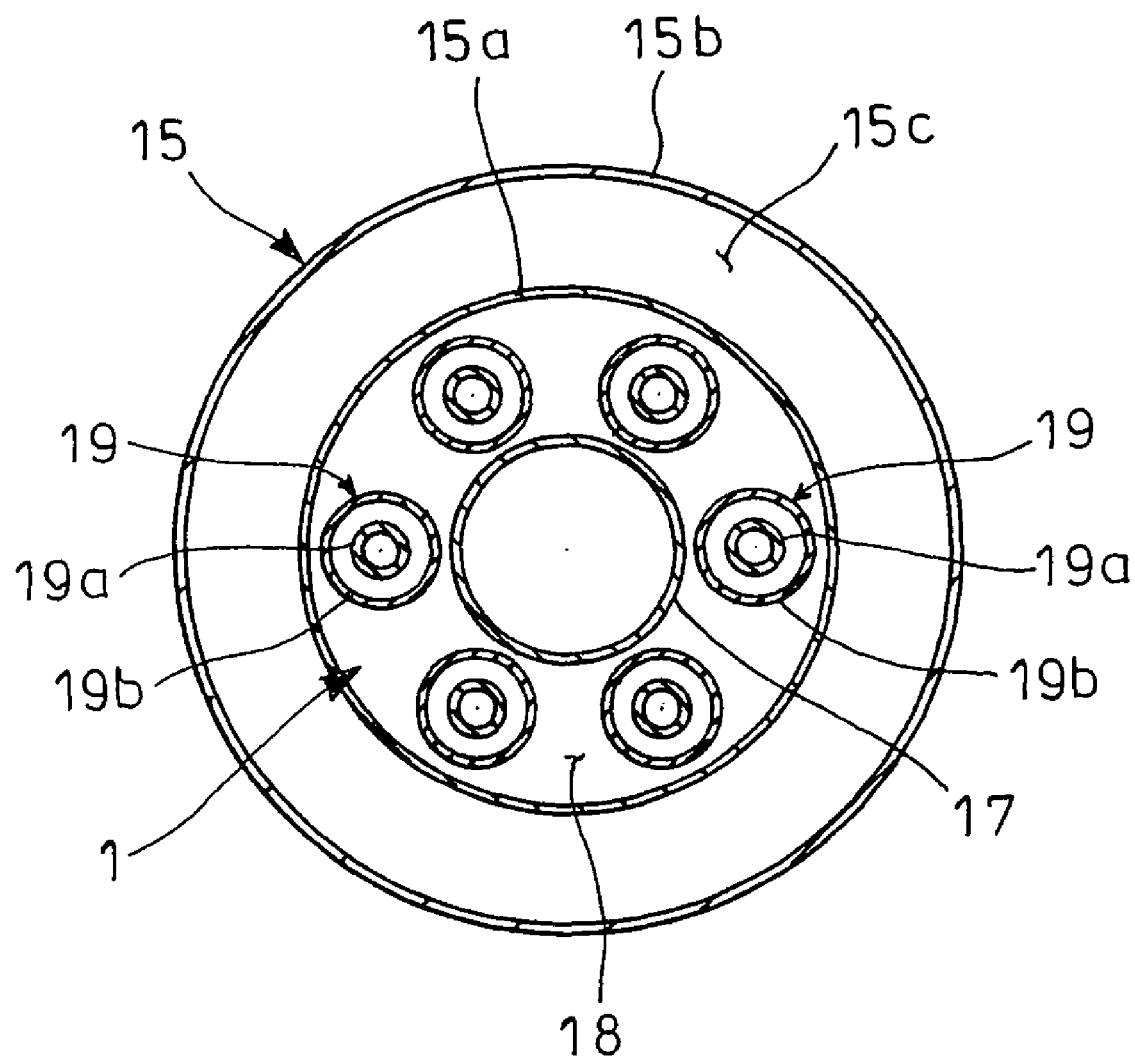
FIG. 4 is a section taken along lines IV-IV in FIG. 3.

FIGS. 3 and 4 show an embodiment of the invention in which parts similar to those in FIGS. 1 and 2 are represented by the same reference numerals. A unit comprising a reformer 1 with its associated instruments (a water vaporizer 2, a primary fuel gasifier 3, a desulfurizer 4, a low-temperature shift converter 5 and a selective oxidation CO remover 6) is covered with and enclosed by a vacuum heat insulating vessel 15 with inner and outer cylinders 15a and 15b and a vacuum heat insulating layer 15c formed therebetween, thereby providing a fuel reforming apparatus.

In this embodiment, the inner cylinder 15a of the vessel 15 itself is utilized as a part of the reformer 1, and a furnace flue 17 is arranged centrally inside the inner cylinder 15a for flowing of the combustion gas from a combustor 16 therethrough. Formed between the furnace flue 17 and the inner cylinder 15a is a flow path 18 of the combustion gas in which a plurality of (six in FIG. 4) reforming tubes 19 are arranged side by side and are charged with reforming catalysts (not shown) through which source gas flows for reforming thereof, thereby providing the reformer 1. Each of the reforming tubes 19 is of a double-walled tube structure with inner and outer tubes 19a and 19b such that the source gas is raised in an outer space between the inner and outer tubes 19a and 19b for heat exchange with the combustion gas, is returned back at upper ends of the tubes and is lowered in a space inside the inner tube 19a.

The furnace flue 17 of the reformer 1 is connected to an upper end of a base inner cylinder 21 rising from a base plate 20. A lower end of the vacuum heat insulating vessel 15 is detachably and sealingly connected via connecting means (not shown) such as bolts and nuts to an upper end of a base outer cylinder 22 short in length and rising from an outer periphery of the base plate 20. The associated instruments of the reformer 1 or the vaporizer 2, gasifier 3, desulfurizer 4, shift converter 5 and CO remover 6 are arranged in a cylindrical space 23 which is defined by the base plate 20, the base inner and outer cylinders 21 and 22 and the inner cylinder 15a of the vacuum heat insulating vessel 15 and which is communicated with the flow path 18 of the combustion gas.

The base inner cylinder 21 is interiorly formed with an air flow path 24 so as to feed air to the combustor 16. Arranged axially of the cylinder is a fuel gas supply pipe 25 so as to feed fuel gas such as anode off gas to the combustor 16. Upon startup, startup fuel which is easy to ignite is adapted to be fed to the combustor 16.

Next, a mode of operation of the above-mentioned embodiment will be described.

With the above-mentioned structure, the construction work of the heat insulating layer 15c is completed merely by enclosing the unit with the vacuum heat insulating vessel 15. As a result, unlike the conventional apparatuses, there is no need of charging the heat insulating material 13 (see FIG. 2) such as ceramic fiber between the reformer 1 and its associated instruments, which fact drastically relieves time and labor for the construction work of the heat insulating layer 15c. Moreover, whenever the catalysts in the reformer 1 are to be replaced or whenever maintenance such as inspection is to be conducted, merely opening the vessel 15 will suffice and there is no need of removing the heat insulating material 13 and/or cutting the vessel body 9 (see FIG. 2).

In the embodiment, use of the vessel 15 with the vacuum heat insulating layer 15c between the inner and outer cylinders 15a and 15b remarkably enhances the heat insulating performance to thereby decrease in volume the heat insulating layer 15c and enable the apparatus to be made compact in size, and suppresses heat dissipation to thereby improve thermal efficiency.

The interior of the inner cylinder 15a of the vessel 15 is utilized as the flow path 18 of the combustion gas for the reformer 1, which brings about simplification in structure of the whole apparatus and thus reduction in const. The reformer 1 comprises the furnace flue 17 having combustion gas from the combustor 16 flowing therethrough and the plural reforming tubes 19 arranged side by side in the flow path 18 of the combustion gas between the furnace flue 17 and the inner cylinder 15a of the vessel 15 and having reforming catalysts charged therein for flowing of the source gas therethrough for reforming of the gas, which makes it possible to shorten in length the reformer 1 through utilization of the multiple reforming tubes 19 and utilization of radiant heat transfer due to high-temperature combustion in the combustor 16, with the advantageous result that the associated instruments such as the vaporizer 2, gasifier 3, desulfurizer 4, shift converter 5 and CO remover 6 can be arranged beneath the reformer 1 with no fear of the fuel reforming apparatus being increased in height.

When the fuel reforming apparatus is to be started, startup fuel is fed to the combustor 16 for combustion with no primary fuel fed to the reformer 1, so that the combustion gas from the burnt startup fuel is heat exchanged with no primary fuel in the reformer 1 and flows around the shift converter 5 and CO remover 6 while it is still hot. As a result, it does not require a long time to elevate these reactors to required temperatures, leading to substantially shortened startup time. In a normal operation, the reformer 1 is fed with the primary fuel; the combustion gas from the burnt fuel gas is heat exchanged with the primary fuel in the reformer 1, vaporizer 2 and gasifier 3 and is lowered in temperature into about 200° C. or temperature level of reaction in the shift converter 5 and in the CO remover 6, so that there is no fear of unnecessary heat exchange occurring even in an instance where reactors such as the shift converter 5 and the CO remover 6 are nakedly arranged in the cylindrical space 23 which is the flow path of the combustion gas.

Thus, no heat insulating material 13 such as ceramic fiber is required to be charged between the instrumental components; the heat insulating layer 15c can be reduced in volume; reduction in size of the apparatus and increase in heat efficiency can be attained; labor and time of construction work for the heat insulating layer 15c can be drastically reduced; maintenance can be readily carried out; and the startup time can be shortened.

In general, in the process for the polymer electrolyte fuel cell 8 (PEFC), a trace of CO contained in the reformed gas is a poisoned substance of the PEFC 8 and is required to be reduced to an extent of a few ppm level, so that the CO remover 6 is used which cools through cooling water the reformed gas having passed through the shift converter 5 and removes CO through oxidation reaction; in place of the CO remover 6, a methanator may be used as CO remover, which uses methanation reaction, i.e., a reversal reaction of methane reformation represented by the equation

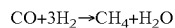

$$CO+3H_2 \rightarrow CH_4+H_2O$$

In the methanator, nickeliferous catalyst are utilized. Provided that the reaction is proceeded at the temperature of about 250° C., no reaction occurs represented by the reaction equation

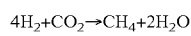

$$4H_2+CO_2 \rightarrow CH_4+2H_2O$$

and therefore there is no fear of overreaction.

It is to be understood that a fuel reforming apparatus and a method for starting said fuel reforming apparatus according to the invention are not limited to the above-mentioned embodiment and that various changes and modifications may be made without departing from the spirit of the invention. For example, there has been disclosed the vacuum heat insulating vessel 15 with the vacuum heat insulating layer 15c between the inner and outer cylinders 15a and 15b; alternatively, the heat insulating layer may be provided by winding heat insulating material with high heat insulating performance around a single vessel shaped like the inner cylinder 15a. In the case of gas fuel such as city gas being used as primary fuel, a primary fuel gasifier 3 may be omitted. Depending upon the primary fuel, the desulfurizer 4 may be arranged outside of the vessel 15.

INDUSTRIAL APPLICABILITY

As is clear from the foregoing, a fuel reforming apparatus according to the invention is suitably applicable to the field of fuel cells since, according to the apparatus, no heat insulating material such as ceramic fiber may be required to be charged between the instruments; the heat insulating layer may be reduced in volume; reduction in size of the apparatus and improvement in heat efficiency can be attained; labor and time of the construction work for the heat insulating layer can be drastically reduced; maintenance can be readily made; and the startup time can be drastically reduced. A method for starting a fuel reforming apparatus according to the invention, which can shorten a startup time, is also suitably applicable to the field of fuel cells.

The invention claimed is:

1. A method for starting and normally operating a fuel reforming apparatus wherein an assembled unit of a reformer, the assembled unit including associated instruments of the reformer, is covered with and enclosed by a vessel to form a heat insulating layer there around, an interior of said vessel being utilized as a flow path of combustion gas for the reformer, comprising:

burning startup fuel without supply of primary fuel to the reformer so that resultant combustion gas from said burnt startup fuel is heat exchanged with no primary fuel in the reformer and is guided to said flow path while being still hot, whereby the combustion gas flows around and heats a low-temperature shift converter and a CO remover; and supplying the primary fuel to the reformer during normal operation after the completion of start-up so that the combustion gas from the burned fuel is heat exchanged with the primary fuel in the reformer, a water vaporizer and a primary fuel gasifier and is controlled into temperature level of reaction in the shift converter and the CO remover, wherein said reformer comprises a furnace flue arranged centrally inside the vessel configured to flow the combustion gas from a combustor there through; and a plurality of reforming tubes arranged side by side in the flow path of the combustion gas between the furnace flue and the vessel and charged with reforming catalysts configured to flow a source gas there through for reforming of the source gas, and said associated instruments of the reformer include said water vaporizer configured to vaporize water into water vapor through heat of the exhaust gas from the reformer;

said low-temperature shift converter configured to lower the gas reformed by the reformer to a required temperature so as to transform CO and $H_2O$ into $CO_2$ and $H_2$, and said CO remover configured to cool the reformed gas having passed through the shift converter so as to remove CO.

2. The method according to claim 1, wherein each of the reforming tubes is a double-walled tube structure that includes an inner tube and an outer tube.

3. The method according to claim 1, wherein the reformer is disposed above the water vaporizer, the water vaporizer is disposed above the shift converter, and the shift converter is disposed above the CO remover.

4. A method for starting and normally operating a fuel reforming apparatus, the fuel reforming apparatus including an assembled unit of a reformer that is covered with and enclosed by a vessel that forms a heat insulating layer there around, the assembled unit including a shift converter, a CO remover, and a water vaporizer configured to vaporize water into water vapor through heat with an exhaust gas from the reformer, wherein an interior of said vessel defines a flow path of combustion gas for the reformer, said method comprising:

burning startup fuel in a furnace flue that is arranged centrally inside the vessel without supplying primary fuel to the reformer;

guiding a combustion gas that results from said burning from said furnace flue to said flow path defined by the interior of said vessel;

guiding the combustion gas through the flow path such that the combustion gas flows around an exterior of each of a plurality of reforming tubes that are arranged side by side in the flow path, then flows to the shift converter, and then flows to the CO remover; and supplying the primary fuel to the reformer during normal operation after the completion of the start-up so that the combustion gas from the burned fuel is heat exchanged with the primary fuel in the reformer, the water vaporizer and a primary fuel gasifier and is controlled into temperature level of reaction in the shift converter and the CO remover, wherein the plurality of reforming tubes are charged with reforming catalysts and are configured to flow a source gas there through so as to reform the source gas, the shift converter is configured to lower a temperature of the source gas reformed by the reformer to a required temperature so as to transform CO and $H_2O$ into $CO_2$ and $H_2$, and the CO remover is configured to cool the reformed gas having passed through the shift converter so as to remove CO, and wherein the guiding the combustion gas through the flow path includes flowing the combustion gas around and heating the plurality of reforming tubes, the shift converter, and the CO remover while the combustion gas is still hot.

5. The method according to claim 4, wherein each of the plurality of reforming tubes is a double-walled tube structure that includes an inner tube and an outer tube and the guiding the combustion gas through the flow path includes flowing the combustion gas directly past an exterior surface of each outer tube of the plurality of reforming tubes.

6. The method according to claim 4, wherein the reformer is disposed above the water vaporizer, the water vaporizer is disposed above the shift converter, and the shift converter is disposed above the CO remover.

7. The method according to claim 4, wherein the combustion gas is guided from the plurality of reforming tubes to the shift converter in a downward direction.

8. The method according claim 7, wherein the combustion gas is guided from the shift converter to the CO remover is a downward direction.

* * * * *